(12) United States Patent
Mohankumar et al.

(10) Patent No.: US 11,598,214 B2
(45) Date of Patent: Mar. 7, 2023

(54) AIRCRAFT ENGINE

(71) Applicant: ROLLS-ROYCE plc, London (GB)

(72) Inventors: Benjamin Mohankumar, Cambridge (GB); Mark J. Wilson, Kirby-in-Ashfield (GB); Cesare A. Hall, Cambridge (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 17/412,759

(22) Filed: Aug. 26, 2021

(65) Prior Publication Data

US 2022/0074308 A1 Mar. 10, 2022

(30) Foreign Application Priority Data

Sep. 7, 2020 (GB) .................. 2014015

(51) Int. Cl.
| | |
|---|---|
| *F01D 5/14* | (2006.01) |
| *B64D 27/10* | (2006.01) |
| *B64D 27/24* | (2006.01) |
| *B64D 33/02* | (2006.01) |
| *F02K 3/075* | (2006.01) |
| *F02K 3/06* | (2006.01) |

(52) U.S. Cl.
CPC ............ *F01D 5/141* (2013.01); *B64D 27/10* (2013.01); *B64D 27/24* (2013.01); *F05D 2220/323* (2013.01); *F05D 2240/30* (2013.01)

(58) Field of Classification Search
CPC ............ F05D 2220/36; F05D 2220/32; F05D 2240/303; F05D 2260/96; F05D 2220/323; F05D 2240/14; F05D 2240/30; F05D 2250/70; F02K 3/06; F02K 3/075; F02K 3/025; F01D 25/24; F01D 5/141; F01D 5/16; F01D 5/145; F02C 7/04; F04D 29/324; F04D 29/544; B64D 27/10; B64D 27/24; B64D 33/02; Y02T 50/60
See application file for complete search history.

(56) References Cited

U.S. PATENT DOCUMENTS

| | | | |
|---|---|---|---|
| 6,371,721 B1 * | 4/2002 | Sathianathan | ........ F01D 21/045 415/200 |
| 2010/0232970 A1 | 9/2010 | Murooka et al. | |

(Continued)

OTHER PUBLICATIONS

Great Britain search report dated Feb. 24, 2021, issued in GB Patent Application No. 2014015.8.

*Primary Examiner* — Eric J Zamora Alvarez
(74) *Attorney, Agent, or Firm* — Barnes & Thornburg LLP

(57) ABSTRACT

An aircraft engine comprising a fan, the fan having a diameter D and including a plurality of fan blades, the fan blades having a sweep metric S, each fan blade having a leading edge, and a forward-most portion on the leading edge of each fan blade being in a first reference plane. The aircraft engine further comprises a nacelle, comprising an intake portion forward of the fan, a forward edge on the intake portion being in a second reference plane, wherein the intake portion has a length L measured along an axis of the aircraft engine between the first reference plane and the second reference plane, the aircraft engine having a cruise design point condition $M_{rel}$, wherein $M_{rel}$ is between 0.4 and 0.93, and L/D is between 0.2 and 0.45.

16 Claims, 5 Drawing Sheets

(56) References Cited

U.S. PATENT DOCUMENTS

| | | |
|---|---|---|
| 2013/0323065 A1 | 12/2013 | Murooka |
| 2015/0044028 A1 | 2/2015 | Lord et al. |
| 2016/0032832 A1* | 2/2016 | Gilson .................... F02C 7/045 |
| | | 415/119 |
| 2018/0073518 A1 | 3/2018 | Wilkin et al. |
| 2019/0308376 A1* | 10/2019 | Backhouse ............. B29C 70/46 |
| 2020/0063603 A1 | 2/2020 | Lord et al. |
| 2020/0200125 A1 | 6/2020 | Moore et al. |

\* cited by examiner

AIRCRAFT ENGINE

CROSS-REFERENCE TO RELATED APPLICATIONS

This application is based upon and claims the benefit of priority from UK Patent Application Number GB2014015.8 filed on 7 Sep. 2020, the entire contents of which are incorporated herein by reference.

BACKGROUND

Technical Field

The present disclosure concerns an aircraft engine, particularly an air engine with a short intake.

Description of the Related Art

It is desirable for aircraft engines to be as fuel-efficient as possible. To that end, a current trend in engine design is towards larger (i.e. increased diameter) fans operating at slower rotation speeds. In the case of gas turbine engines, increasing the fan diameter allows for a larger bypass ratio.

Reducing, the fan rotation speed helps reduce losses resulting from shockwaves at the fan. Such shockwaves are chiefly an issue for high-speed fans, i.e. fans designed for air moving through the fan with a high relative Mach number ($M_{rel}$). To mitigate this effect, a sweep is introduced to the leading edge of the fan blade, which reduces the Mach number component normal to the shock, and therefore reduces the associated entropy production.

Swept blades however are not without their challenges. Swept blades are usually heavier than non-swept blades, owing to the need for an increased chord length to give them mechanical stability. Swept blades are more difficult to balance as their curvature affects the centre of gravity of the blade. The swept shape also affects the natural frequencies of the blade. It is important to keep excitation frequencies away from blade resonance frequencies, else resonant excitation could lead to reduced blade life. Complex sweep shapes result in higher manufacturing costs, reducing the incentive to sweep the blade unless necessary. Therefore, swept blades are generally the preserve of high-speed fans where overcoming the issues associated with sweeping the fan blades is worth doing to reduce losses caused by shockwaves. Is it not normally necessary or desirable to introduce sweep into a low-speed fan blade.

Increasing the diameter of the fan means a commensurate increase in nacelle diameter, and therefore surface area. Increasing the surface area of the nacelle means an increase in the drag experienced by the nacelle, as well as an increase in the nacelle's weight, which means a reduction in engine fuel efficiency. In order to counter this effect, it is proposed to shorten the length of the nacelle, and more specifically to shorten the distance between the forward intake of the nacelle and the main fan, so as to minimise the increase in nacelle weight and surface area as a whole.

There is therefore a need for an engine design which factors in these design considerations to produce a more efficient engine, both in terms of running and manufacturing costs.

SUMMARY

According to a first aspect there is provided an aircraft engine comprising a fan, the fan having a diameter D and including a plurality of fan blades, each fan blade having a sweep metric S, a leading edge, and a forward-most portion on the leading edges of the fan blades being in a first reference plane. The aircraft engine further comprises a nacelle, comprising an intake portion upstream of the fan, a forward-most edge on the intake portion being in a second reference plane, wherein the intake portion has a length L measured along an axis of the aircraft engine between the first reference plane and the second reference plane, the aircraft engine having a cruise design point condition $M_{rel}$, wherein $M_{rel}$ is from 0.4 to 0.93, and L/D is from 0.2 to 0.45.

An aircraft engine with a fan designed to fit within these parameters has been found to provide increased fuel efficiency by allowing for a higher bypass ratio whilst minimising drag on the nacelle, and reducing the amount of entropy produced by shockwaves.

The aircraft engine may have a fan wherein each fan blade has a sweep metric S from 0.2 to 0.9. The aircraft engine may have a fan wherein each fan blade has a sweep metric S from 0.25 to 0.9. The aircraft engine may have a fan wherein each fan blade has a sweep metric S from 0.30 to 0.9, The aircraft engine may have a fan wherein each fan blade has a sweep metric S from 0.35 to 0.9. The aircraft engine may have a fan wherein each fan blade has a sweep metric S from 0.40 to 0.9.

An aircraft engine with a fan comprising blades which have a sweep metric within the above boundaries has been found to provide further fuel efficiency by further reducing the amount of entropy produced by shockwaves.

The aircraft engine may have an L/D ratio from 0.25 to 0.40. The aircraft engine may have an L/D ratio from 0.30 to 0.40.

The aircraft engine may be a geared aircraft engine. Gearing an aircraft engine allows for the fan to rotate at a different speed to the turbine that drives it.

The aircraft engine may be an electric aircraft engine. Electricity-powered aircraft engines are better for the environment than gas turbine engines, as they do not release chemical by-products into the environment during operation.

The aircraft engine may have a bypass ratio greater than 10. Large bypass ratio gas turbine engines are generally more fuel efficient and so better for the environment compared to similar engines with smaller bypass ratios.

The aircraft engine may have a fan diameter from 220 cm to 380 cm.

The rotation speed of the fan may vary in use. Generally, the rotational speed is lower for fans with a higher diameter. Purely by way of non-limitative example, the rotational speed of the fan at cruise design point conditions ($M_{rel}$) may be less than 2500 rpm, for example less than 2300 rpm. Purely by way of further non-limitative example, the rotational speed of the fan at cruise design point conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise design point conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

As used herein, cruise design point conditions have the conventional meaning and would be readily understood by the skilled person. Thus, for a given engine for an aircraft, the skilled person would immediately recognise cruise design point conditions to mean the operating point of the engine at mid-cruise of a given mission (which may be referred to in the industry as the "economic mission") of an aircraft to which the engine is designed to be attached. In this regard, mid-cruise for a gas turbine engine is the point in an aircraft flight cycle at which 50% of the total fuel that is burned between top of climb and start of descent has been burned (which may be approximated by the midpoint—in terms of time and/or distance—between top of climb and start of descent. Cruise design point conditions thus define an operating point of the engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise design point conditions the engine provides half of the total thrust that would be required for steady state operation of that aircraft at mid-cruise. In other words, for a given engine for an aircraft, cruise design point conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise design point conditions $M_{rel}$ is clearly defined.

Purely by way of example, the forward speed at the cruise design point condition may be any point in the range of from Mach 0.7 to 0.9, for example 0.75 to 0.85; for example 0.76 to 0.84, for example 0.17 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise design point condition. For some aircraft, the cruise design point conditions may be outside these ranges, for example below Mach 0.7 or above Mach 0.9.

Purely by way of example, the cruise design point conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise design point conditions may correspond to standard atmospheric conditions at any given altitude in these ranges.

Purely by way of example, the cruise design point conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise design point conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, an aircraft engine described and/or claimed herein may operate at the cruise design point conditions defined elsewhere herein. Such cruise design point conditions may be determined by the cruise design point conditions (for example the mid-cruise design point conditions) of an aircraft to which at least one (for example 2 or 4) engine may be mounted in order to provide propulsive thrust.

According to an aspect, there is provided an aircraft comprising an aircraft engine as described and/or claimed herein. The aircraft according to this aspect is the aircraft for which the engine has been designed to be attached. Accordingly, the cruise design point conditions according to this aspect correspond to the mid-cruise of the aircraft, as defined elsewhere herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
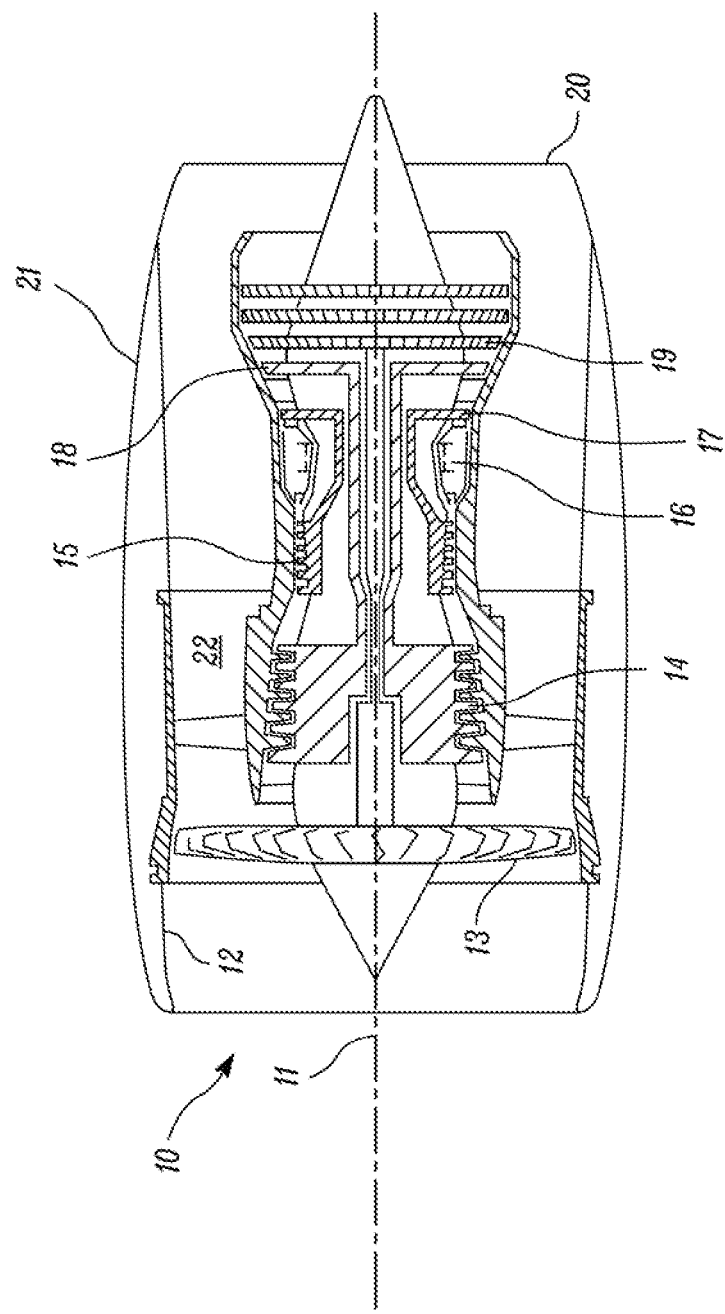
FIG. 1 is a sectional side view of an example gas turbine aircraft engine.

With reference to FIG. 1, an example of an aircraft engine, in this case a gas turbine engine, is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The aircraft engine 10 works in the conventional manner for a gas turbine engine so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place. As such, the region of the engine with the intake 12 shall be referred to as the "front" or "forward" part of the engine, and the region of the engine with the exhaust nozzle 20 shall be referred to as the "back" or "rearward" part of the engine. This "front" and "back"

nomenclature will be true for all types of engine considered here, including electric engines.

Furthermore, with reference to all examples herein, the relative positions of components within the engine may be described in relation to the order in which air entering the engine flows over them. Air enters the engine at the intake, and those components or parts of components at which the air arrives first can be described as upstream or forward of those components that air arrives at later, which by comparison are downstream or backwards. For example, the front or forward-most part of a component is that part of the component that air arrives at first when travelling through an engine. Equally, the back or rear-most part of a component is that part of a component the air arrives at last when travelling through the engine. The front or forward-most part of a component is therefore upstream from the back or rear-most part of the component, and equally the back or rear-most part of the engine is downstream from the front or forward-most part of a component.

The compressed air exhausted from the high-pressure compressor 1 is directed into the combustion equipment 16 where it is mixed with fuel and the mixture combusted. The resultant hot combustion products then expand through, and thereby drive the high 17, intermediate 18 and low-pressure 19 turbines before being exhausted through the nozzle 20 to provide additional propulsive thrust. The high 17, intermediate 18 and low-pressure 19 turbines drive respectively the high-pressure compressor 15, intermediate-pressure compressor 14 and fan 13, each by suitable interconnecting shaft. An alternative design of engine (not shown) is one that includes a gearbox between the fan 13 and one or more of the turbines 18, 19, usually positioned in the engine core just behind the fan, that allows the fan 13 to rotate at a different speed that the turbine driving it. This can be useful as it allows the fan and the turbine(s) to each rotate at their own optimised operating speeds during use. Such engines can be referred to as geared gas turbine engines.

Figure 2:
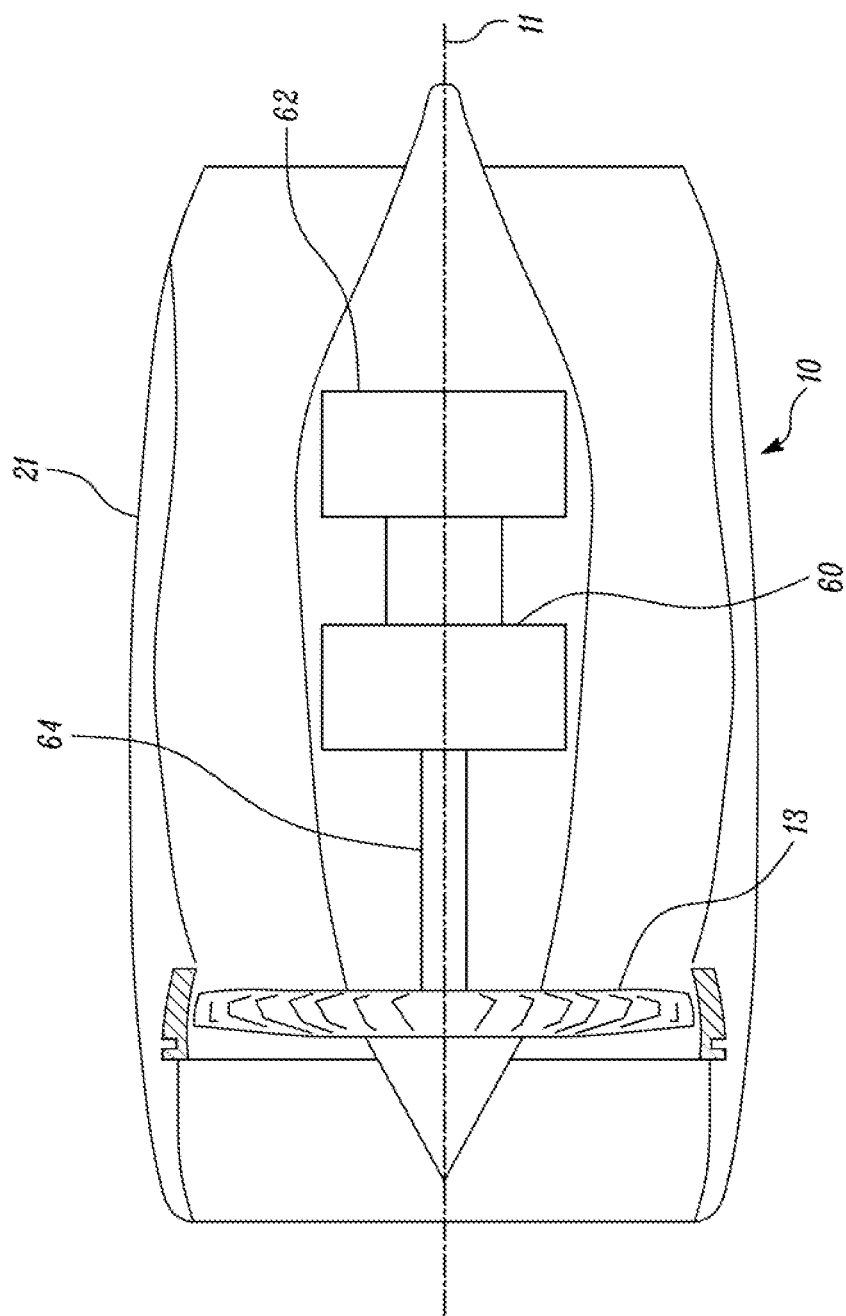
FIG. 2 is a second sectional side view of an example aircraft engine.

In the case of an engine 10 powered by electricity, as shown in FIG. 2, the fan 13 can be powered by an electric motor 60, which can occupy a similar position behind the fan to the compressor section of the example gas turbine engine. The electric motor 60 can be directly connected to the fan 13 by a motor shaft 64. A source of electrical power 62 for the electric motor 60 can be stored within the engine, or could be powered by batteries stored elsewhere within the aircraft.

Figure 3:
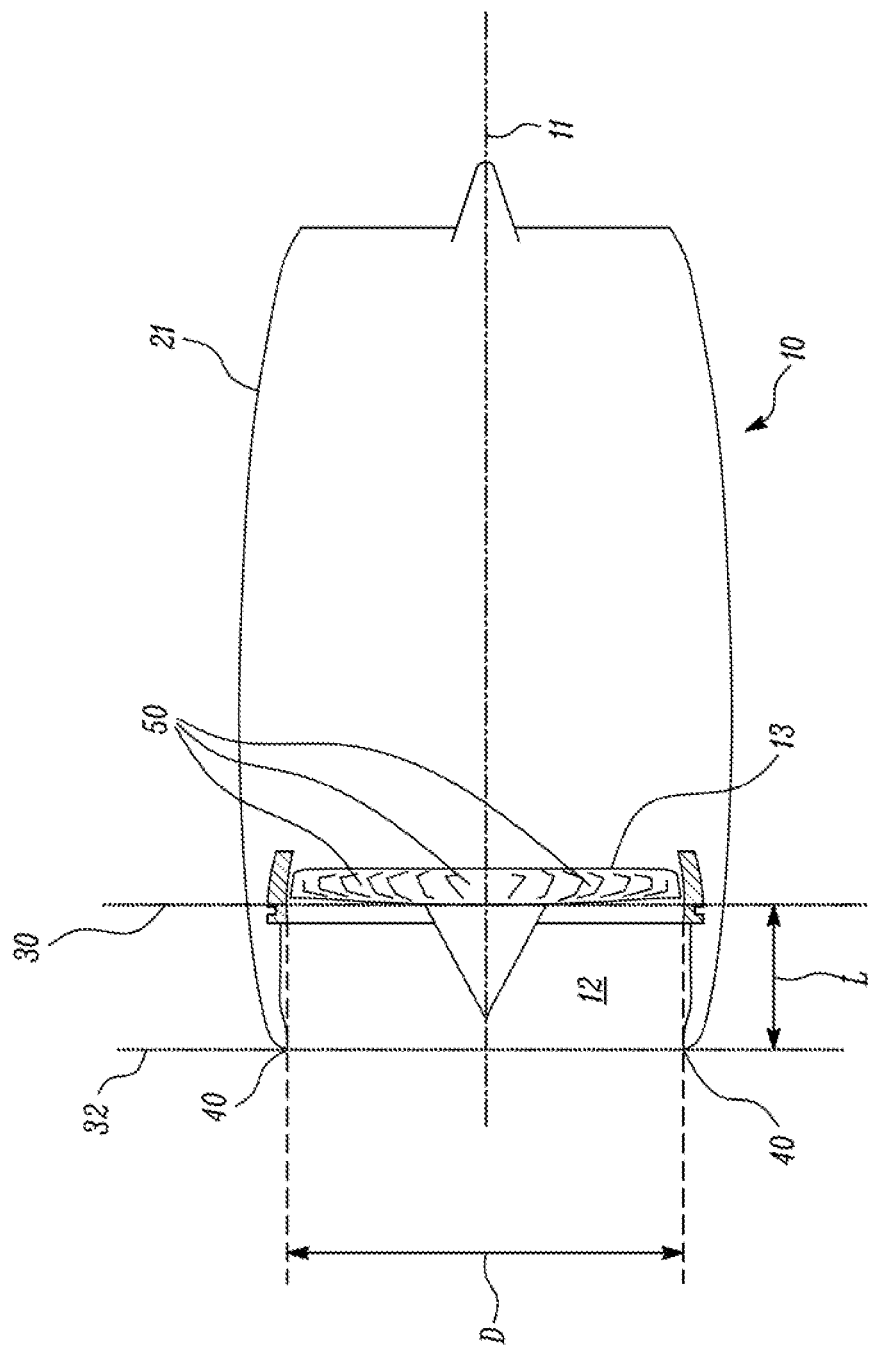
FIG. 3 is a sectional side schematic view of an example electric aircraft engine.

FIG. 3 shows an exemplary layout of the fan and nacelle for an aircraft engine 10 with a selection of key parameters marked. The fan 13 comprises a number of fan blades 50, such as that shown in FIG. 4. The radius of the fan 13, also referred to as the fan tip radius, may be measured between the principle engine axis 11 and the tip $r_{tip}$ (see FIG. 4) of a fan blade 50 at its forward edge. The fan diameter (D) may simply be defined as twice the radius of the fan 13. The forward-most portion of the fan, i.e. the leading edges of the fan blades, are situated in a first reference plane 30. The nacelle 21, comprising the intake portion 12 forward of the fan 13, has forward edges 40 on the inlet portion which are situated in a second reference plane 32. The distance between the first reference plane 30 and second reference plane 32 is equal to the length L. This distance L is commonly referred to as the intake length.

Figure 4:
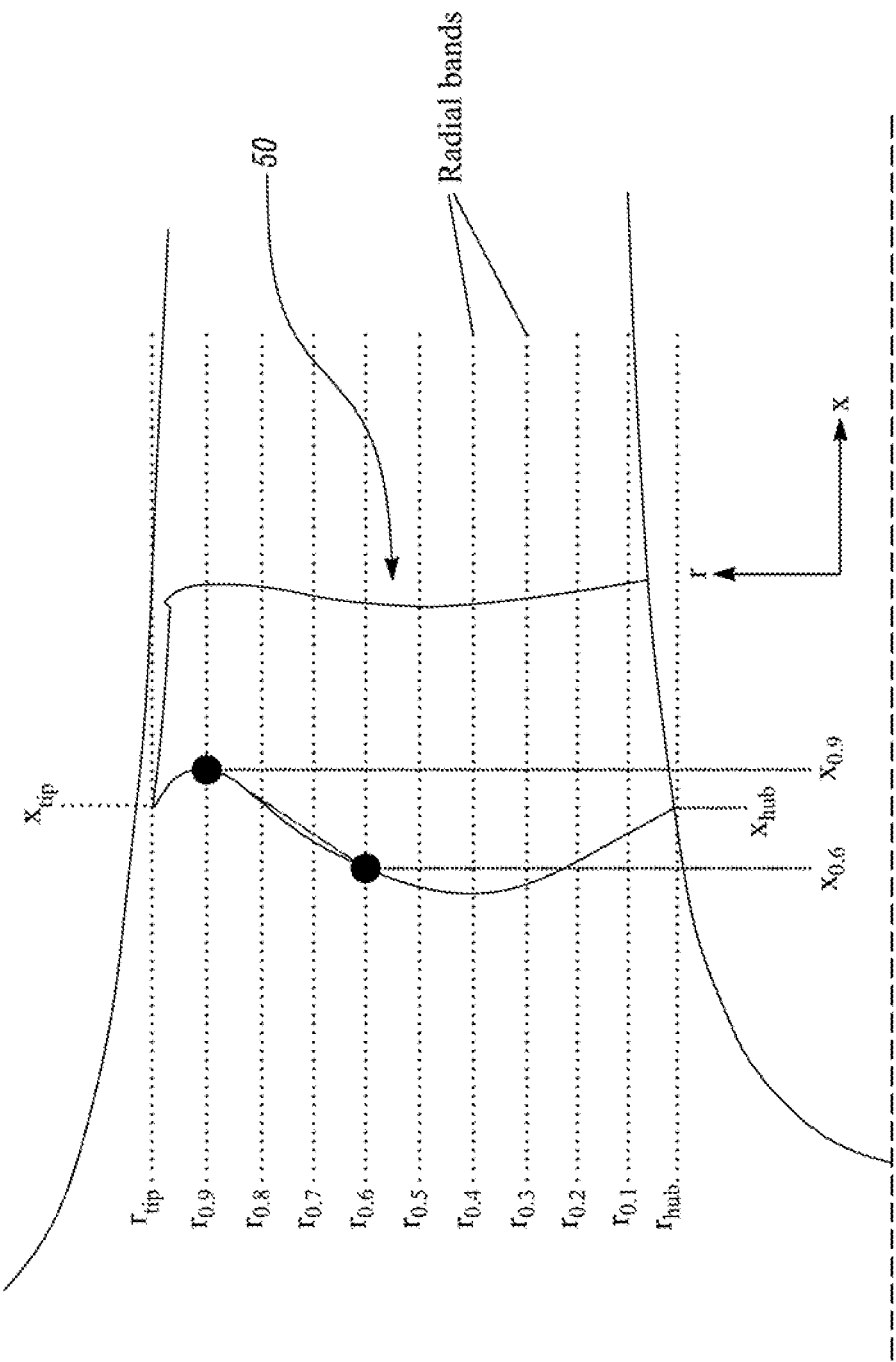
FIG. 4 is an isometric view of a swept fan blade.

FIG. 4 shows an example of a swept fan blade 50. To define the sweep of the fan blade, a number of parameters are used. The extent along the blade in the radial direction is denoted by r, extending from r=0 or $r_{hub}$ (i.e. the base of the blade at its forward edge) to r=1 or $r_{tip}$ (i.e. the furthest radial extent of the blade at its forward edge), the distance from 0 to 1 being equal to the span of the blade. x represents the position of the leading (forward) edge of the blade in the plane perpendicular to r and parallel to the principal and rotational axis 11. Using these terms, the sweep of the fan blade 50 can be defined in terms of $$\frac{dx}{dr},$$

referred to as the axial stack slope.

Figure 5:
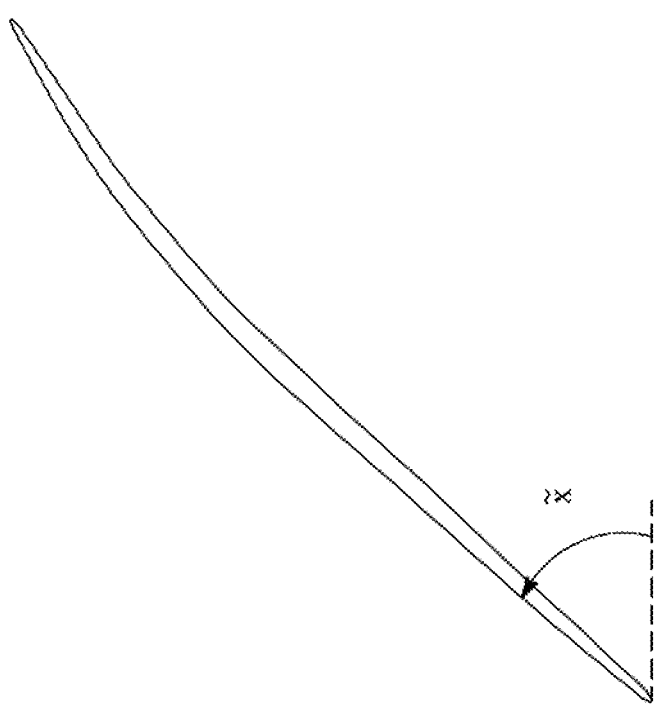
FIG. 5 is a plan sectional view of a swept fan blade.

Highlighted in FIG. 4 is the region of the blade leading edge between ($x_{0.6}$, $r_{0.6}$) (i.e. the position of x and r 60% of the way from the base of the blade to the tip of the blade, or 60% of the blade span) and ($x_{0.9}$, $r_{0.9}$) (i.e. the position of x and r at 90% of the blade span). Here we define a sweep metric, S, as the axial stack slope, $$\frac{dx}{dr},$$

between 0.6 (60%) and 0.9 (90%) of the span, normalised by a proxy of the relative Mach number at cruise design point conditions (i.e. the relative magnitude of the combined vectors of the velocity of the blade and the velocity of the air it is passing through compared with the speed of sound under the same conditions), $M_{rel}$:

$$S = \sqrt{\left(\frac{\left(\frac{dx}{dr}\right)_{0.6-0.9}}{M_{rel}}\right)^2}$$

Where $$\left(\frac{dx}{dr}\right)_{0.6-0.9}$$

is defined as:

$$\left(\frac{dx}{dr}\right)_{0.6-0.9} = \frac{\left(\frac{x_{0.9} - x_{hub}}{r_{tip} - r_{hub}}\right) - \left(\frac{x_{0.6} - x_{hub}}{r_{tip} - r_{hub}}\right)}{0.9 - 0.6}$$

Where $M_{rel}$ is defined at the cruise design point condition:

$$M_{rel} = \frac{\left(\frac{\tilde{r}\Omega}{\sin\tilde{\chi}}\right)}{\sqrt{1.4 \times 284 \times 250.5}}$$

Where Ω=cruise design point rotational speed in radians per second, and where $\tilde{\chi}$ (see FIG. 5) is the discrete area-averaged rotor inlet blade angle:

$$\tilde{X} = \frac{X_{0.1}\pi(r_{0.2}^2 - r_{hub}^2) + X_{0.3}\pi(r_{0.4}^2 - r_{0.2}^2) + X_{0.5}\pi(r_{0.6}^2 - r_{0.4}^2) + X_{0.7}\pi(r_{0.8}^2 - r_{0.6}^2) + X_{0.9}\pi(r_{tip}^2 - r_{0.8}^2)}{\pi(r_{tip}^2 - r_{hub}^2)}$$

Where $\tilde{r}$ is the discrete area-averaged rotor inlet radii:

$$\tilde{r} = \frac{r_{0.1}\pi(r_{0.2}^2 - r_{hub}^2) + r_{0.3}\pi(r_{0.4}^2 - r_{0.2}^2) + r_{0.5}\pi(r_{0.6}^2 - r_{0.4}^2) + r_{0.7}\pi(r_{0.8}^2 - r_{0.6}^2) + r_{0.9}\pi(r_{tip}^2 - r_{0.8}^2)}{\pi(r_{tip}^2 - r_{hub}^2)}$$

As stated earlier, using fan blades with a high sweep metric S is known for use in engines that have large L/D ratio intakes, or with fans designed to operate at high $M_{rel}$. However, engines with small L/D ratio intakes designed to operate at low $M_{rel}$ are not known. In addition, the inventors have discovered that employing fans with a high sweep metric can have a further advantageous effect on the efficiency of an engine which has a small L/D ratio and operates at low $M_{rel}$ to such a degree that it justifies the increased manufacturing challenges and costs involved. This is because they have determined that an engine with a small L/D ratio has a different $M_{rel}$ distribution across the face of the fan compared to an engine with large L/D ratio. Specifically, there is a localised area towards the bottom of the fan face which has a high $M_{rel}$ compared to the average $M_{rel}$ across the whole fan face, and as the L/D ratio decreases, the size of this comparatively high $M_{rel}$ area increases. This in turn leads to an increased area where shock becomes an issue, decreasing the efficiency of the fan. As L/D becomes smaller, the size of the comparatively high $M_{rel}$ area grows across the fan to a point where the losses due to shockwave formation become problematic for efficient operation of the engine.

The inventors have determined that the most efficient way to shape the sweep of the fan blade for an engine which has a small L/D ratio, and operates at low $M_{rel}$ is to have a sweep metric of between 0.2 and 0.9. Therefore, contrary to established belief, a low-speed fan can benefit from being swept, particularly with a sweep metric S of between 0.2 and 0.9, if the low-speed fan is part of an aircraft engine with an intake L/D ratio of between 0.2 and 0.45 operating at low $M_{rel}$.

Other aircraft engines to which the present disclosure may be applied may have alternative configurations, By way of example such engines may have an alternative number of interconnecting shafts (e.g. two) and/or an alternative number of compressors and/or turbines. Further the engine may comprise a gearbox provided in the drive train from a turbine to a compressor and/or fan. Alternatively, the aircraft engine maybe powered by electricity, i.e. it may be an electric aircraft engine.

It will be understood that the disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. An aircraft engine comprising:
 a fan, the fan having a diameter D, the fan including a plurality of fan blades, each fan blade having a sweep metric S and a leading edge, a forward-most portion on the leading edge of each fan blade being in a first reference plane; and
 a nacelle, comprising an intake portion upstream of the fan, a forward-most edge on the intake portion being in a second reference plane, wherein the intake portion has a length L measured along an axis of the aircraft engine between the first reference plane and the second reference plane;
 wherein the aircraft engine has a relative Mach number at a cruise design point condition $M_{rel}$ from from 0.4 to 0.93 and L/D is from 0.2 to 0.45, and
 wherein the sweep metric S of each fan blade is from 0.2 to 0.9.

2. The aircraft engine of claim 1, wherein the sweep metric S of each fan blade is from 0.25 to 0.9.

3. The aircraft engine of claim 1, wherein the sweep metric S of each fan blade is from 0.30 to 0.9.

4. The aircraft engine of claim 1, wherein the sweep metric S of each fan blade is from 0.35 to 0.9.

5. The aircraft engine of claim 1, wherein the sweep metric S of each fan blade is from 0.40 to 0.9.

6. The aircraft engine of claim 1, wherein L/D is from 0.25 to 0.40.

7. The aircraft engine of claim 1, wherein L/D is from 0.30 to 0.40.

8. The aircraft engine of claim 1, wherein the aircraft engine is a gas turbine engine.

9. The aircraft engine of claim 8, wherein the gas turbine engine is a geared gas turbine engine.

10. The aircraft engine of claim 9, wherein the aircraft engine accommodates a first rate of air flow into an intermediate pressure compressor and a second rate of air flow which passes through a bypass duct, a ratio of the second rate of air flow to the first rate of air flow being greater than 10.

11. The aircraft engine of claim 8, wherein the aircraft engine accommodates a first rate of air flow into an intermediate pressure compressor and a second rate of air flow which passes through a bypass duct, a ratio of the second rate of air flow to the first rate of air flow being greater than 10.

12. The aircraft engine of claim 1, wherein the aircraft engine is powered by electricity.

13. The aircraft engine of claim 1, wherein the fan diameter D is from 220 cm to 380 cm.

14. An aircraft comprising at least one aircraft engine according to claim 1.

15. An aircraft engine comprising:
 a fan, the fan having a diameter D, the fan including a plurality of fan blades, each fan blade having a sweep metric S and a leading edge, a forward-most portion on the leading edge of each fan blade being in a first reference plane; and a nacelle, comprising an intake portion upstream of the fan, a forward-most edge on the intake portion being in a second reference plane, wherein the intake portion has a length L measured along an axis of the aircraft engine between the first reference plane and the second reference plane;

wherein the aircraft engine has a relative Mach number at a cruise design point condition $M_{rel}$ from 0.4 to 0.93 and L/D is from 0.2 to 0.45, and wherein the sweep metric S of each fan blade is from 0.25 to 0.9.

16. An aircraft engine comprising:

a fan, the fan having a diameter D, the fan including a plurality of fan blades, each fan blade having a sweep metric S and a leading edge, a forward-most portion on the leading edge of each fan blade being in a first reference plane; and a nacelle, comprising an intake portion upstream of the fan, a forward-most edge on the intake portion being in a second reference plane, wherein the intake portion has a length L measured along an axis of the aircraft engine between the first reference plane and the second reference plane;

wherein the aircraft engine has a relative Mach number at a cruise design point condition $M_{rel}$ from 0.4 to 0.93 and L/D is from 0.2 to 0.45, and wherein the sweep metric S of each fan blade is from 0.30 to 0.9.

* * * * *